(12) United States Patent
Wang et al.

(10) Patent No.: US 8,886,202 B2
(45) Date of Patent: Nov. 11, 2014

(54) METHOD, APPARATUS AND SYSTEM FOR OPTIMIZING AND UPDATING TRACKING AREA

(75) Inventors: Xuelong Wang, Beijing (CN); Hongzhuo Zhang, Shanghai (CN); Binsong Tang, Shanghai (CN); Yang He, Shanghai (CN); Xiaoli Shi, Shanghai (CN); Shlai Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 13/216,697

(22) Filed: Aug. 24, 2011

(65) Prior Publication Data

US 2011/0306363 A1 Dec. 15, 2011

Related U.S. Application Data

(63) Continuation of application No. PCT/CN2010/070723, filed on Feb. 24, 2010.

(30) Foreign Application Priority Data

Feb. 25, 2009 (CN) .......................... 2009 1 0009246

(51) Int. Cl.
*H04W 40/00* (2009.01)
*H04W 24/02* (2009.01)
*H04W 8/02* (2009.01)

(52) U.S. Cl.
CPC .................................. *H04W 24/02* (2013.01); *H04W 8/02* (2013.01)
USPC .......................................... 455/446; 455/458

(58) Field of Classification Search
None
See application file for complete search history.

(56) References Cited

U.S. PATENT DOCUMENTS

| | | | |
|---|---|---|---|
| 6,535,745 B1 * | 3/2003 | Seraj | 455/458 |
| 2004/0185859 A1 * | 9/2004 | Barkan | 455/449 |
| 2010/0118725 A1 * | 5/2010 | Chiou et al. | 370/252 |
| 2011/0223918 A1 * | 9/2011 | Dahlen et al. | 455/436 |

FOREIGN PATENT DOCUMENTS

| | | |
|---|---|---|
| CN | 1988721 A | 6/2007 |
| CN | 101001184 A | 7/2007 |
| CN | 101170816 A | 4/2008 |
| CN | 101291524 A | 10/2008 |
| WO | WO 2008/093750 A1 | 8/2008 |

OTHER PUBLICATIONS

Written Opinion of the International Searching Authority in International Application No. PCT/CN2010/070723 mailed Jun. 3, 2010.
International Search Report in International Application No. PCT/CN2010/070723 mailed Jun. 3, 2010.

(Continued)

*Primary Examiner* — German J Viana Di Prisco
(74) *Attorney, Agent, or Firm* — Leydig, Voit & Mayer, Ltd.

(57) ABSTRACT

The present invention relates to the field of mobile communication technologies, and discloses a method, an apparatus, and a system for optimizing a tracking area, and a method, an apparatus, and a system for updating a tracking area. The method for optimizing a tracking area includes the following steps: an Operation, Administration and Maintenance entity obtains an optimization threshold, and performs a tracking area optimization according to the optimization threshold. With the present invention, the Operation, Administration and Maintenance entity can optimize the tracking area automatically.

1 Claim, 6 Drawing Sheets

```
The Operation, Administration and Maintenance entity
obtains base station scene information, geographic location     101
information, number of tracking areas under planning,
threshold number of planned tracking areas, and threshold
number of base stations included in a tracking area
```

```
The Operation, Administration and Maintenance entity
plans the tracking areas according to the base station scene    102
information, geographic location information, number of
tracking areas under planning, threshold number of planned
tracking areas, and threshold number of base stations
included in a tracking area
```

(56) References Cited

OTHER PUBLICATIONS

First Chinese Office Action (translation) of Chinese Patent Application No. 200910009246.4, mailed Dec. 31, 2011; Chinese language Office Action (12 pgs.).

3GPP TSG-RAN WG3 Meeting #57; R3-071594; Aug. 20-24, 2007, Athens, Greece; Agenda Item: 13.2.4; Source: QUALCOMM Europe, T-Mobile; Title: New SON use-case; Tracking Area Optimization; Document for: Approval (XP050962407) (4 pgs.).

3GPP TSG RAN WG3 Meeting #57; R3-071415; Aug. 20-24, 2007, Athens, Greece; Title: Self-Optimization for Tracking Areas; Source: ZTE; Agenda Item: 13.3.4c; Document for: Discussion and Approval 9XP050966245) (2 pgs.).

European Patent Office communication for application No. 10745820.2-2412/2403284; regarding extended European search report, pursuant to Rule 62 EPC, the supplemental European search report (Art. 153(7) EPC) and the European search report; mailed Mar. 26, 2012; (18 pgs.).

$2^{nd}$ Office Action in corresponding Chinese Patent Application No. 200910009246.4 (Sep. 13, 2012).

* cited by examiner

METHOD, APPARATUS AND SYSTEM FOR OPTIMIZING AND UPDATING TRACKING AREA

CROSS-REFERENCE TO RELATED APPLICATION

This application is a continuation of International Application No. PCT/CN2010/070723, filed on Feb. 24, 2010, which claims priority to Chinese Patent Application No. 200910009246.4, filed on Feb. 25, 2009, both of which are hereby incorporated by reference in their entireties.

FIELD OF THE INVENTION

The present invention relates to the field of mobile communication technologies, and in particular, to a technology for planning and optimizing a tracking area and a technology for updating a tracking area.

BACKGROUND OF THE INVENTION

A mobile communication network is divided into different service areas according to tracking area codes (Tracking Area Code, TAC). The network pages a mobile user equipment by sending a paging message in a tracking area (Tracking Area, TA). The TA is a basic unit of a paging area in a system. That is, a paging message is sent for paging per TA, and the paging message of the mobile user equipment is sent among all cells in the TA. A cell belongs to a TA, but the cells included in a TA may belong to different eNBs (eNode B, evolved NodeB).

In order to determine the location of the mobile user equipment, the coverage area of each network is divided into several TAs. The size of a TA (namely, the area covered by a TAC) is a key factor in the system. The division of TAs is rather important in network planning. In the process of dividing the TAs, the frequency of updating the TAs should be as low as practicable so long as the paging load is not too high. Frequent TA updates in the system may lead to a waste of network resources. The paging load decides the maximum scope of the TA, and accordingly, the location update load of the edge cell decides the minimum scope of the TA. The paging load depends on the maximum paging capacity of the eNB. If the TA is too wide, the paging channel will be overloaded. If the TA is too narrow, too many TA update messages will be generated when a UE (User Equipment) moves between TAs.

The process of paging a UE is: The network side of mobile communication system pages the UE according to the stored TA area where the UE is located currently. The TA area where the UE is located currently is referred to as a paging area.

In the present TA planning in a network planning and after the TA that covers the cell changes, the network planners have to update the configuration in relevant nodes of the network through manual modification, which involves plenty of human resources and increases the cost of network planning and updating.

SUMMARY OF THE INVENTION

According to one aspect, the present invention provides a method for optimizing a tracking area, where the method includes: by an Operation, Administration and Maintenance entity, obtaining an optimization threshold; and performing a tracking area optimization according to the optimization threshold.

According to another aspect, the present invention provides a method for updating a tracking area, where the method includes: receiving a configuration update message that carries tracking area optimization information; and updating a tracking area according to the configuration update message.

According to another aspect, the present invention provides an Operation, Administration and Maintenance entity, including: a threshold obtaining unit, configured to obtain an optimization threshold; and an optimizing unit, configured to perform a tracking area optimization according to the optimization threshold.

According to another aspect, the present invention provides a system for optimizing a tracking area, where the system includes the foregoing Operation, Administration and Maintenance entity.

According to another aspect, the present invention provides an apparatus for updating a tracking area, where the apparatus includes: an information receiving unit, configured to receive a configuration update message that carries tracking area optimization information; and an updating unit, configured to update a tracking area according to the configuration update message.

According to another aspect, the present invention provides a system for updating a tracking area, where the system includes the foregoing apparatus for updating a tracking area.

In the preceding method, apparatus and system for optimizing a tracking area, the Operation, Administration and Maintenance entity obtains an optimization threshold, and optimizes a current tracking area automatically. In the preceding method, apparatus and system for updating a tracking area, a tracking area may be updated according to a received configuration update message that carries tracking area optimization information. The preceding method and apparatus for optimizing a tracking area, and the method, apparatus and system for updating a tracking area perform initial planning and optimization of a tracking area automatically, and update the configuration of network relevant entities automatically, which saves human resources significantly and reduces the cost of network planning and updating.

DETAILED DESCRIPTION OF THE EMBODIMENTS

In the process of implementing the present invention, an OAM (Operation, Administration and Maintenance) entity is used to implement initial planning and optimization of TAs.

In an E-UTRAN (Evolved Universal Mobile Telecommunication System Terrestrial Radio Access Network), the concept of TAs is uniformly applied in location management of UEs. A corresponding identifier is allocated to a UE, and the location of the UE is managed according to the identifier. A TA generally includes multiple cells or base stations. Automatic planning and optimization of TAs may reduce the operation expenditure of an operator. According to the embodiments of the present invention, the initial planning and the optimization of TAs are performed automatically, and the parameters such as TAC and TA list are updated automatically after the optimization of TAs.

The embodiments of the present invention are detailed below with reference to the accompanying drawings.

The OAM entity performs initial planning for TAs automatically in the following method.

Figure 1:
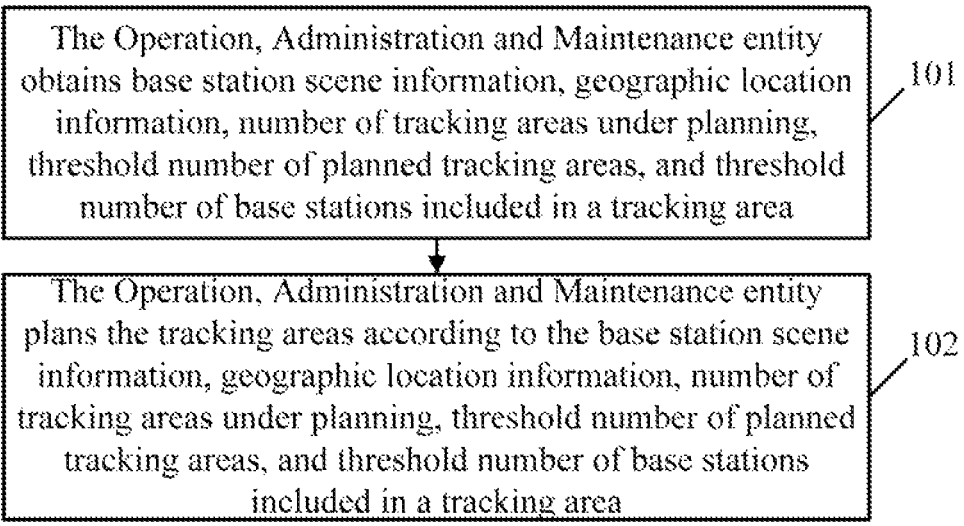
FIG. 1 illustrates a method for planning a tracking area according to an embodiment of the present invention.

As shown in FIG. 1, an embodiment of the present invention provides a method for planning a TA, where the method includes the following steps:

101. An Operation, Administration and Maintenance entity obtains base station scene information, geographic location information, number of TAs under planning, threshold value of planned TAs, and threshold value of base stations included in a TA. The threshold value of base stations included in a TA refers to the maximum number of base stations that may be accommodated in a TA.

102. Plan the TAs according to the base station scene information, geographic location information, number of TAs under planning, threshold value of planned TAs, and threshold value of base stations included in a TA.

In the TA planning process, the OAM entity first judges whether the number of TAs under planning is less than a first threshold value of planned TAs. If the number of TAs under planning is less than the first threshold value of planned TAs, the OAM entity obtains the whole planned area according to the base station scene information and the geographic location information, and then divides the base stations into two equal parts according to the distance from the base station to the lower left vertex of the whole planned area.

If the OAM entity judges that the number of TAs under planning is greater than the first threshold value of planned TAs but less than a second threshold value of planned TAs, the OAM entity obtains the whole planned area according to the base station scene information and the geographic location information, and then divides the whole planned area into M subareas; designs the number of redundant base stations in a TA according to the threshold value of base stations in the TA, and determines the number (N) of base stations included in the TA; determines a central TA according to the geographic location information, subareas, and number (N) of base stations included in a TA, namely, plans the N base stations at the center of the whole planned subarea as one TA; divides the whole planned area into two subareas along a line with a 45° angle to the eastbound direction in the whole planned area; and divides TAs by using the determined number (N) of base stations included in a TA as a planning step length and using the base stations that are in the central TA and at the lower left corner in the planned area as references.

If the OAM entity judges that the number of TAs under planning is greater than the second threshold value of planned TAs, the OAM entity designs the number of redundant base stations in a TA according to the threshold value of base stations included in a TA, and determines the number (N) of base stations included in a TA; determines an urban scene center as an initial planning point according to the base station scene information and geographic location information; and plans the closest N base stations around the initial planning point as a central TA. The central TA is planned in the following procedure:

(1) Obtain values of the distance from the base stations to the urban scene center in the whole planned area.

(2) Arrange the obtained distance values in ascending order, obtain the first N base stations, allocate TACs to the N base stations, and use the N base stations as a central TA. N is a planning step length, namely, the number of base stations that can be included in a TA; $N=INT(TA\_MaxNB \times 80\%)$, where $Y=INT(X)$ is a rounding function; the TA_MaxNB is the maximum number of base stations that may be accommodated in a TA, namely, the threshold value of base stations included in a TA.

The OAM entity divides the whole planned area into two subareas along a line with a 45° angle to the horizontal direction in the whole planned area, and divides TAs in the two subareas. The TAs are planned in the following procedure:

(1) Obtain values of the distance from the base stations in the subarea to the lower left vertex of the whole planned area, and arrange the values in ascending order.

(2) Count the number of base stations in each subarea, and obtain the number of TAs under division.

(3) According to the ascending order of the values of the distance from each base station to the lower left vertex of the whole planned area, divide TAs by using N as a step length, and allocate a TAC to each TA.

(4) If there are remaining base stations in the area division, set the remaining base stations as the last TA.

Optionally, after the tracking areas are planned, if new base stations need to be added to the planned area that covers all tracking areas, the OAM entity may expand the capacity of the tracking areas.

The method for expanding capacity of tracking areas provided in this embodiment of the present invention may include the following: The OAM entity obtains geographic location information of the new base stations needed to be added, distance between the new base stations and neighboring base stations, and paging capacity of the tracking areas around the new base stations; and adds the new base stations to the tracking area with the smallest paging capacity according to the geographic location information of the new base stations, distance between the new base stations and the neighboring base stations, and paging capacity of the tracking areas around the new base stations. After the tracking areas are expanded, the OAM entity may send a message that carries tracking area optimization information.

The method for expanding capacity of tracking areas provided in this embodiment may further include the following: The OAM entity obtains geographic location information of the new base stations needed to be added, and the tracking area that covers a neighboring base station which has the strongest signals, adds the new base stations to the tracking area that covers a neighboring base station which has the strongest signals, and sends a message that carries tracking area optimization information.

In the method for planning tracking areas according to this embodiment, the OAM entity obtains the base station scene information, geographic location information, and the threshold value of base stations included in a tracking area, and performs initial planning for the current area automatically according to the obtained information. When new base stations need to be added to the planned area that covers all tracking areas, the network entity may obtain the information about the new base stations needed to be added and information about neighboring base stations of the new base stations automatically, add the new base stations to the tracking area that covers the neighboring base stations according to the obtained information, and send a message that carries tracking area optimization information so that the network expands the capacity of tracking areas automatically. In this way, no manual planning is involved, human resources are saved greatly, and the cost of network planning is reduced.

Figure 2:
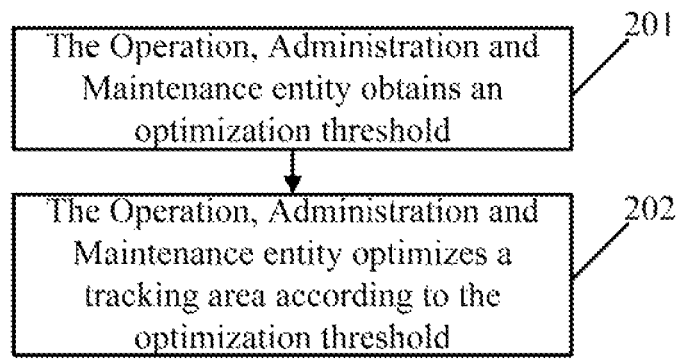
FIG. 2 is a flowchart of a method for optimizing a tracking area according to an embodiment of the present invention.

As shown in FIG. 2, an embodiment of the present invention provides a method for optimizing a TA, where the method includes the following steps:

201. An Operation, Administration and Maintenance entity obtains an optimization threshold.

Specifically, optimization thresholds may be categorized based on the paging count in a TA and the handover count at the edge of a TA. The optimization thresholds based on the paging count in a TA include: TA splitting threshold, TA re-planning threshold, and TA combination threshold; and the optimization thresholds based on the handover count at the edge of a TA include a re-planning threshold.

202. Perform a TA optimization according to the optimization threshold.

The detailed TA optimization process is described according to the optimization thresholds categorized above:

(I) When the TA optimization is performed based on the paging count in a TA, the optimization thresholds include: TA splitting threshold, TA re-planning threshold, and TA combination threshold.

1. Divide the current TA into two TAs if the paging count of the current TA is greater than the TA splitting threshold.

2. Optimize the base stations in the current TA if the paging count of the current TA is greater than the TA re-planning threshold. The optimization procedure is as follows:

The OAM entity obtains the information about the base station that needs to be re-planned if the paging count of the current TA is greater than the TA re-planning threshold. The process of obtaining the information about the base station needed to be re-planned is: In the initial planning, assuming that the paging capacity of the current TA is in direct proportion to the number of base stations in the current TA, when the OAM entity performs TA optimization, if judging that the paging count of the current TA is greater than the TA re-planning threshold, the OAM entity obtains the number of base stations corresponding to the paging count greater than the TA re-planning threshold according to the proportion of the paging capacity of the initially planned TA to the number of base stations in the current TA, where the number of base stations is equivalent to the number of base stations that need to be removed from the currently optimized TA, namely, the information about base stations that need to be re-planned.

According to the information about the base stations needed to be re-planned, the OAM entity judges the paging capacity of the neighboring TA. If the paging capacity of the neighboring TA permits, the OAM entity plans the base stations needed to be re-planned to the neighboring TA, and sends a message that carries the TA optimization information; if the paging capacity of the neighboring TA does not permit, the OAM entity re-plans the base stations needed to be re-planned, and sends a message that carries the TA optimization information.

3. Combine the current TA with the neighboring TA if the sum of the paging count of the current TA and the paging count of the neighboring TA is less than the TA combination threshold.

(II) When the TA optimization is based on the handover count in a TA, the optimization thresholds include a TA re-planning threshold.

If a ratio obtained by dividing the count of handovers of a UE under a border base station to the neighboring TA by the count of handovers back to the original TA is greater than the TA re-planning threshold, the OAM entity plans the border base station to the neighboring TA.

It should be noted that the method for optimizing a TA according to this embodiment may be implemented after the method for planning a TA in the previous embodiment. That is, the method for optimizing a TA may be applied to optimize the TAs planned by the OAM entity automatically, or optimize the TAs planned manually.

More specifically, after finishing the TA optimization, the OAM entity sends a message that carries TA optimization information to the relevant entities, indicating that the TAs have been optimized.

In the method for optimizing a tracking area according to this embodiment, the OAM entity obtains an optimization threshold, and optimizes the current tracking area automatically. In this way, no manual planning is involved, human resources required for network optimizing are saved greatly, and the cost of network optimizing is reduced.

Figure 3:
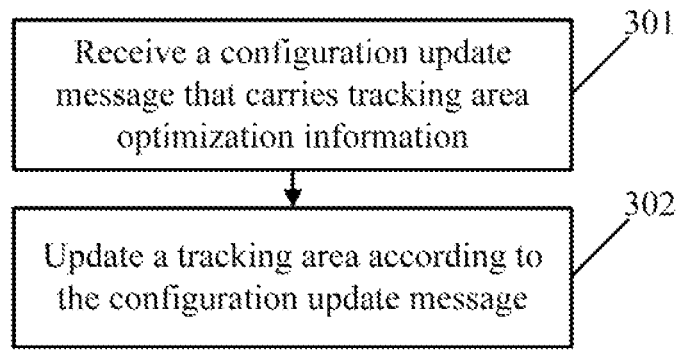
FIG. 3 is a flowchart of a method for updating a tracking area according to an embodiment of the present invention.

As shown in FIG. 3, an embodiment of the present invention provides a method for updating a TA, where the method includes the following steps:

301. Receive a configuration update message that carries TA optimization information.

302. Update a TA according to the received configuration update message.

It should be noted that the TA may be updated by entities such as a mobility management entity (Mobility Management Entity, MME), an eNB, or a UE.

By using the method for updating a TA according to this embodiment of the present invention, a TA is updated according to a received configuration update message that carries TA optimization information. Therefore, the entities that need to perform a TA update can update the TA automatically according to the received configuration update message that carries TA optimization information. In this way, human resources are saved greatly, and the cost of network updating is reduced.

The following gives more details about the TA optimization and how the foregoing three entities update a TA in the case of TA splitting, TA combination and TA re-planning in the TA optimization process.

Figure 4:
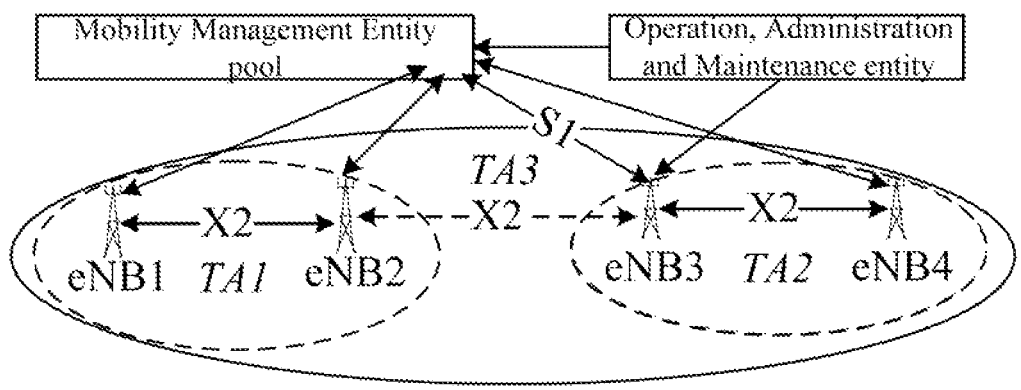
FIG. 4 is a schematic diagram showing how to split a TA in a same MME pool area in a tracking area optimization process according to an embodiment of the present invention.

FIG. 4 is a schematic diagram showing how to split a TA in a same MME pool area in a TA optimization process according to an embodiment of the present invention. The MME pool area is a defined area, in which the UE motion does not change the MME that serves the UE. It is assumed that eNB1, eNB2, eNB3, and eNB4 belong to the same TA3.

401. When the OAM entity judges that the count of paging attempts from the MME to eNB1, eNB2, eNB3, and eNB4 exceeds the TA splitting threshold, the OAM entity splits TA3 into TA1 and TA2. It is assumed that eNB1 and eNB2 belong to the same TA1, and that eNB3 and eNB4 belong to the same TA2.

402. The OAM entity sends a configuration update message that carries TA optimization information to eNB1, eNB2, eNB3, and eNB4, and eNB1, eNB2, eNB3, and eNB4 update the TA according to the configuration update message that carries the TA optimization information. Further, eNB1 and eNB2 modify the TAC to TA1 according to the configuration update message that carries the TA optimization information; and eNB3 and eNB4 modify the TAC to TA2 according to the configuration update message that carries the TA optimization information.

It should be noted that here, the OAM entity may exchange information with other network entities through a northbound interface Itf-N or a private interface Itf-S.

403. A configuration update message that carries TA optimization information is sent between eNB1 and eNB2 in TA1, and between eNB3 and eNB4 in TA2 to exchange information and update the TA. For example, an X2 configuration update message carries TA optimization information. Here, it is appropriate that an existing X2 interface message or newly added X2 interface message carries the TA optimization information to exchange TAC information and update the TA information between base stations.

404. eNB1, eNB2, eNB3, and eNB4 send a configuration update message that carries TA optimization information to the MME, and the MME updates the TA according to the configuration update message that carries the TA optimization information. Specifically, eNB1, eNB2, eNB3, and eNB4 exchange information with the MME through an S1 interface to update the TA of the MME. For example, an S1 configuration update message carries TA optimization information. Here, it is appropriate that an existing or newly added S1 interface message carries the TA optimization information to the MME to update the TAC information of the MME. In addition, the OAM entity may also send a configuration update message that carries TA optimization information to the MME, and the MME updates the TAC according to the TA optimization information.

405. The MME sends a configuration update message that carries tracking area optimization information to the neighboring MME, and the neighboring MME updates the TAC according to the tracking area optimization information and sends a configuration update confirmation message to the MME. Specifically, the MME exchanges TAC information with the neighboring MME through an S10 interface. The detailed implementation process is: The MME sends a configuration update message that carries TA optimization information to the neighboring MME through an S10 interface, and the neighboring MME sends a configuration update confirmation message to the MME.

406. After the base stations and the MME finish updating configuration according to the configuration update message that carries TA optimization information, the UE may implement the TA update process in the following three modes:

Mode 1:
(1) When notifying the UE to update the TAC by sending a paging message, the MME adds TA optimization information to a MIB (Master Information Block). The TA optimization information may be a random number. Here, the configuration update message that carries TA optimization information is the paging message. The UE can obtain the TA update time according to the TA optimization information, namely, the random number. Afterward, the UE updates the TA list, namely, updates TA3 in the TA list to TA1 or TA2.
(2) The updated TA list of the UE is reported to the MME.
(3) The MME pages only TA3 at the next time. That is, the MME does not update the TA immediately in order to ensure the continuity of the UE.

Mode 2:
(1) The OAM entity sends a configuration update message that carries the TA optimization information to the base station through a northbound interface. The configuration update message carries an indication of TA change time of each base station and an indication of notifying the TA update time to the UE, where the TA update time is calculated by different base stations in the TA randomly, and notifies the UE to update the TA list at different time. The UE updates TA3 in the TA list to TA1 or TA2.
(2) The updated TA list of the UE is reported to the MME.
(3) The MME pages all TA1, TA2, and TA3 at the next time.

Mode 3:
(1) Before the OAM entity updates the TA, the MME sends a paging message that carries TA optimization information to the UE. In this way, the MME notifies the UE to update the TA list directly. Here, the configuration update message that carries TA optimization information is the paging message.
(2) The updated TA list of the UE is reported to the MME.
(3) The MME pages only TA1 and TA2 at the next time.

It should be noted that the process of notifying the MME to update configuration may also be completed through exchanging TAC information between the OAM entity and the MME. For example, the OAM entity may exchange information with the MME through a northbound interface Itf-N.

In this embodiment, when a TA is split in the same MME pool area, the OAM entity obtains the TA splitting optimization threshold, and performs splitting optimization for the current tracking area automatically; after completion of the TA splitting, the OAM entity sends a configuration update message that carries TA optimization information. Therefore, all other entities can update the TA automatically by receiving the configuration update message that carries the TA optimization information. In this way, no manual planning is involved, human resources required for network optimizing are saved greatly, and the cost of network optimizing is reduced.

Figure 5:
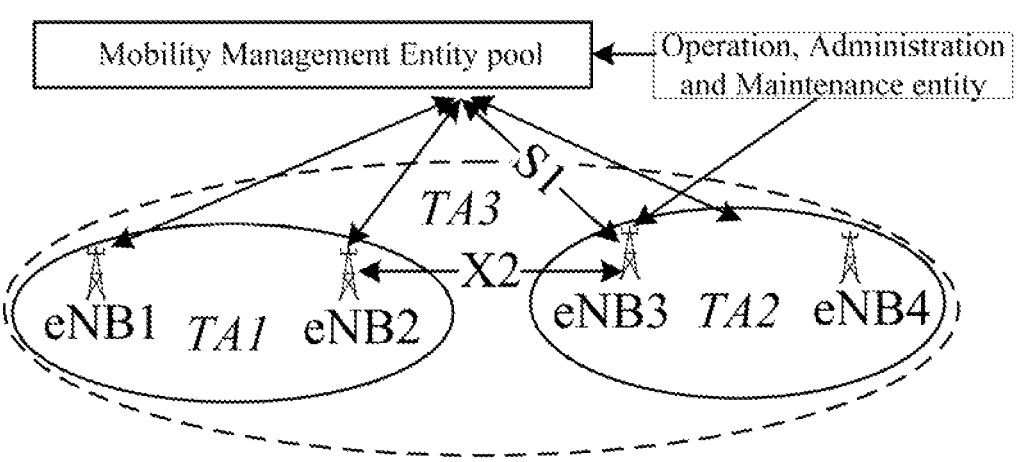
FIG. 5 is a schematic diagram showing how to combine tracking areas in a same MME pool area in a tracking area optimization process according to an embodiment of the present invention.

FIG. 5 is a schematic diagram showing how to combine TAs in the same MME pool area in a TA optimization process according to an embodiment of the present invention. In this embodiment, it is assumed that eNB1 and eNB2 belong to the same TA1, and that eNB3 and eNB4 belong to the same TA2.

501. The OAM entity combines TA1 and TA2 into TA3 if judging that the sum of counts of paging attempts from the MME to eNB1, eNB2, eNB3, and eNB4 is less than the TA combination threshold.

502. The OAM entity sends a configuration update message that carries TA optimization information to eNB1, eNB2, eNB3, and eNB4; and eNB1, eNB2, eNB3, and eNB4 update the TA according to the configuration update message that carries the TA optimization information. Further, eNB1, eNB2, eNB3, and eNB4 modify the TAC to TA3 according to the configuration update message that carries TA optimization information.

It should be noted that here, the OAM entity may exchange information with other network entities through a northbound interface Itf-N or a private interface Itf-S.

503. eNB1, eNB2, eNB3, and eNB4 that are in TA3 update the TA according to the configuration update message that carries TA optimization information. For example, an X2 configuration update message carries TA optimization information. Here, it is appropriate that an existing X2 interface message or newly added X2 interface message carries the TA optimization information to exchange TAC information and update the TA information between base stations.

504. eNB1, eNB2, eNB3, and eNB4 send a configuration update message that carries TA optimization information to the MME, and the MME updates the TA according to the configuration update message that carries the TA optimization information. Specifically, eNB1, eNB2, eNB3, and eNB4 exchange TAC information with the MME through an S1 interface to update the TA of the MME.

505. The MME sends a configuration update message that carries TA optimization information to the neighboring MME, and the neighboring MME updates the TA (namely, updates the TAC information) according to the TA optimization information, and sends a configuration update confirmation message to the MME. Specifically, the MME exchanges TAC information with the neighboring MME through an S10 interface. The detailed implementation process is: The MME sends a configuration update message that carries TA optimization information to the neighboring MME through an S10 interface, and the neighboring MME sends a configuration update confirmation message to the MME.

506. After the base stations and the MME finish updating configuration according to the configuration update message that carries TA optimization information, the UE may implement the TA update process in the following three modes:

Mode 1:

(1) When notifying the UE by sending a paging message, the MME adds TA optimization information to an MIB. The TA optimization information may be a random number. Here, the configuration update message that carries TA optimization information is the paging message. The UE can obtain the TA update time according to the TA optimization information, namely, the random number. Afterward, the UE updates the TA list, namely, updates TA1 or TA2 in the TA list to TA3.

(2) The updated TA list of the UE is reported to the MME.

(3) The MME pages only TA1 or TA2 at the next time. That is, the MME does not update the TA immediately in order to ensure continuity of the UE.

Mode 2:

(1) The OAM entity sends a configuration update message that carries the TA optimization information to each base station through a northbound interface. The configuration update message carries an indication of TA change time of each base station and an indication of notifying the TA update time to the UE, where the TA update time is calculated by different base station s in the TA randomly, and notifies the UE to update the TA list at different time. The UE updates TA1 or TA2 in the TA list to TA3.

(2) The updated TA list of the UE is reported to the MME.

(3) The MME pages all TA1, TA2, and TA3 at the next time.

Mode 3:

(1) Before the OAM entity updates the TA, the MME sends a paging message that carries TA optimization information to the UE. In this way, the MME notifies the UE to update the TA list directly. Here, the configuration update message that carries TA optimization information is the paging message.

(2) The updated TA list of the UE is reported to the MME.

(3) The MME pages only TA3 at the next time.

It should be noted that the process of notifying the MME to update configuration may also be completed through exchanging TAC information between the OAM entity and the MME. For example, the OAM entity may exchange information with the MME through a northbound interface Itf-N.

In this embodiment, when TAs are combined in the same MME pool area, the OAM entity obtains the TA combination optimization threshold, and performs combination optimization for the current TA automatically; after completion of the TA combination, the OAM entity sends a configuration update message that carries TA optimization information. Therefore, all other entities can update the TA automatically by receiving the configuration update message that carries the TA optimization information. In this way, no manual planning is involved, human resources required for network optimizing are saved greatly, and the cost of network optimizing is reduced.

Figure 6:
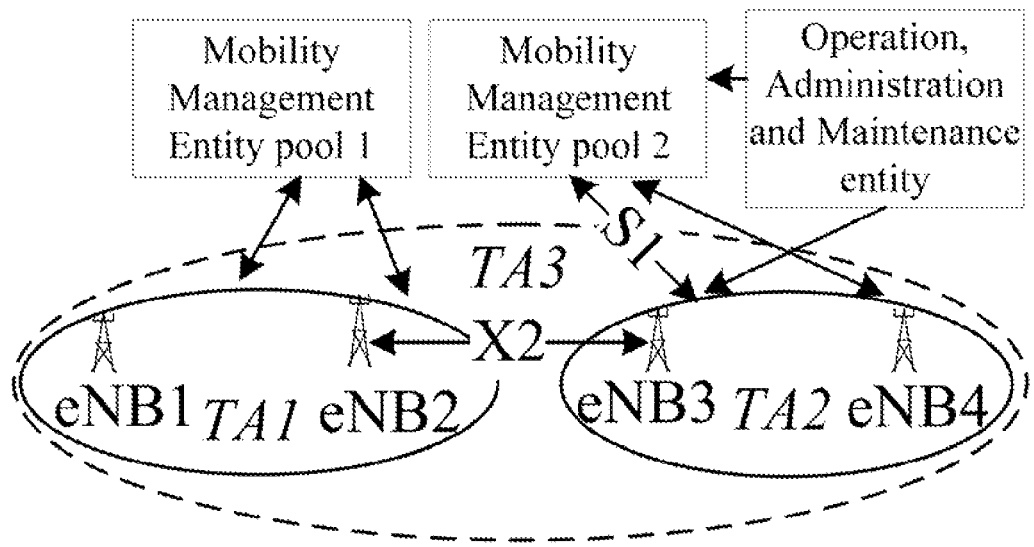
FIG. 6 is a schematic diagram showing how to combine tracking areas in different MME pool areas in a tracking area optimization process according to an embodiment of the present invention.

FIG. 6 is a schematic diagram showing how to combine TAs in different MME pool areas in a TA optimization process according to an embodiment of the present invention. In this embodiment, it is assumed that eNB1 and eNB2 belong to the same TA1, and that eNB3 and eNB4 belong to the same TA2. The base stations in TA1 are connected to the MME in MME pool area 1 through an S1 interface; the base stations in TA2 are connected to the MME in MME pool area 2 through an S1 interface; and the base stations in the combined TA3 are connected to the MME in MME pool area 2 through an S1 interface.

Steps 601-602 are the same as steps 501-502 in FIG. 5, and are not repeatedly described here.

603. In the process of combining TA1 with TA2, eNB1 and eNB2 in TA1 disconnect an X2 interface between the base stations in MME pool area 1; and eNB1 and eNB2 set up an X2 interface between the base stations in MME pool area 2. Therefore, eNB1, eNB2, eNB3, and eNB4 can exchange TAC information through the X2 interface. The disconnection and the setup of the X2 interface in the combination process are described below:

(1) An X2 interface release message is sent between base stations eNB1 and eNB2 in MME pool area 1 to request the release of the X2 interface. This message carries a cause value, indicating that the TA which covers the eNB has changed.

(2) The base station in MME pool area 1 returns an X2 interface release confirmation/complete message. This step is optional.

(3) eNB1 and eNB2 in MME pool area 1 release the corresponding SCTP (Stream Control Transmission Protocol) association and its resources, and the base station in MME pool area 1 deletes the relevant configuration information.

(4) eNB1 and eNB2 set up an SCTP association with MME pool area 2.

(5) eNB1 and eNB2 send an X2 setup message to the base station in MME pool area 2 to initiate setup of an X2 interface. This message carries TA optimization information.

(6) The base station in MME pool area 2 sends an X2 setup response message to eNB1 and eNB2.

604. In the process of combining TA1 with TA2; the current MME releases the interface directed to the base station, the SCTP association and the resources, and deletes the relevant configuration information; and the neighboring MME sets up an interface directed to the base station, sets up the SCTP association, and allocates the corresponding resources. Specifically, eNB1 and eNB2 in TA1 disconnect the S1 interface directed to the MME in MME pool area 1; and eNB1 and eNB2 set up an S1 interface directed to the MME in MME pool area 2. Therefore, the combined eNB1, eNB2, eNB3, and eNB4 can exchange TAC information with the MME in MME pool area 2 through the S1 interface. The disconnection and the setup of the S1 interface are described below:

(1) eNB1 and eNB2 send an S1 interface release message to the MME in MME pool area 1 to request the release of the S1 interface. This message carries a cause value, indicating that the TA which covers the eNB has changed.

(2) The MME in MME pool area 1 sends an S1 interface release confirmation/complete message to the eNB. This step is optional.

(3) eNB1 and eNB2 release the corresponding SCTP association and the corresponding resources with the MME in MME pool area 1, and the MME deletes the configuration information related to eNB1 and eNB2.

(4) eNB1 and eNB2 set up an SCTP association with the MME in MME pool area 2.

(5) eNB1 and eNB2 send an S1 setup message to the MME in MME pool area 2 to initiate setup of an S1 interface. This message carries TA optimization information.

(6) The MME in MME pool area 2 sends an S1 setup response message to eNB1 and eNB2.

605. After the base stations and the MME finish updating configuration according to the configuration update message that carries TA optimization information, the UE may implement the TA update process in the following three modes:

Mode 1:

(1) When notifying the UE by sending a paging message, the MME adds TA optimization information to an MIB. The information may be a random number. Here, the configuration update message that carries TA optimization information is the paging message. The UE can obtain the TA update time according to the TA optimization information, namely, the random number. Afterward, the UE updates the TA list, namely, updates TA1 or TA2 in the TA list to TA3.

(2) The updated TA list of the UE is reported to the MME.

(3) The MME pages only TA1 or TA2 at the next time. That is, the MME does not update the TA immediately in order to ensure continuity of the UE.

Mode 2:

(1) The OAM entity may send a configuration update message that carries the TA optimization information to each base station through a northbound interface. The configuration update message carries an indication of TA change time of each base station and an indication of notifying the TA update time to the UE, where the TA update time is calculated by different base stations in the TA randomly, and notifies the UE to update the TA list at different time. The UE updates TA1 or TA2 in the TA list to TA3.

(2) The updated TA list of the UE is reported to the MME.

(3) The MME pages all TA1, TA2, and TA3 at the next time.

Mode 3:

(1) Before the OAM entity updates the TA, the MME sends a paging message that carries TA optimization information to the UE. In this way, the MME notifies the UE to update the TA list directly. Here, the configuration update message that carries TA optimization information is the paging message.

(2) The updated TA list of the UE is reported to the MME.

(3) The MME pages only TA3 at the next time.

It should be noted that the process of notifying the MME to update configuration may also be completed through exchanging TAC information between the OAM entity and the MME. For example, the OAM entity may exchange information with the MME through a northbound interface Itf-N.

In this embodiment, when TAs are combined in different MME pool areas, the OAM entity obtains the TA combination optimization threshold, and performs combination optimization for the current TA automatically; after the OAM entity finishes the TA combination, the entities that store the TAC can update the TA automatically by receiving the configuration update message that carries the TA optimization information. In this way, no manual planning is involved, human resources required for network optimizing are saved greatly, and the cost of network optimizing is reduced.

Figure 7:
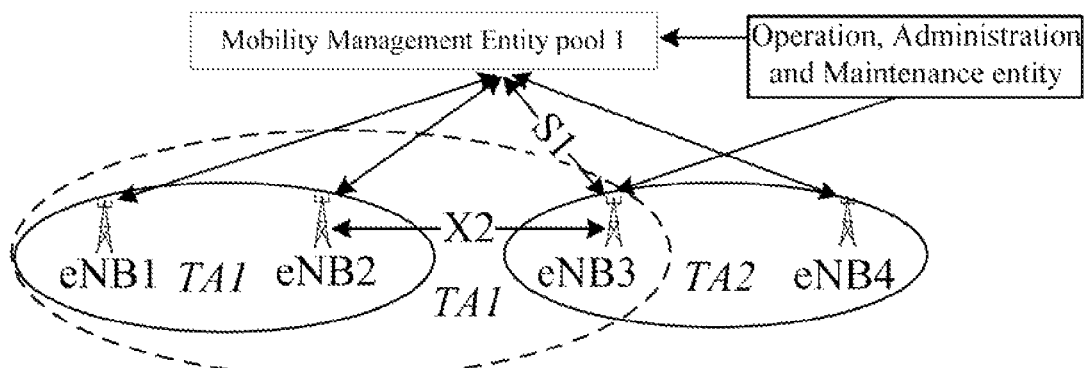
FIG. 7 is a schematic diagram showing how to re-plan a tracking area in a same MME pool area in a tracking area optimization process according to an embodiment of the present invention.

FIG. 7 is a schematic diagram showing how to re-plan TAs in the same MME pool area in a TA optimization process according to an embodiment of the present invention. In this embodiment, it is assumed that eNB1 and eNB2 belong to the same TA1, and that eNB3 and eNB4 belong to the same TA2.

701. When the OAM entity judges that the sum of counts of paging attempts from the MME to eNB1, eNB2, eNB3, and eNB4 exceeds the TA re-planning threshold, the OAM entity determines the number of base stations needed to be re-planned according to the method for obtaining the base stations needed to be re-planned in step 202 in FIG. 2. In this case, it is assumed that eNB3 in TA2 needs to be re-planned to TA1.

702. The OAM entity sends a configuration update message that carries TA optimization information to eNB3, and eNB3 modifies the TAC to TA1 according to the configuration update message that carries the TA optimization information.

It should be noted that here, the OAM entity may exchange information with other network entities through a northbound interface Itf-N or a private interface Itf-S.

703. A configuration update message that carries TA optimization information is sent from eNB3 to eNB1, eNB2, and eNB4 to exchange information and update the TA. For example, an X2 configuration update message carries the TAC information to update the TA information of eNBs. Here, it is appropriate that an existing X2 interface message or newly added X2 interface message carries the TA optimization information to exchange TAC information and update the TA information between base stations.

704. eNB1, eNB2, eNB3, and eNB4 send a configuration update message that carries TA optimization information to the MME, and the MME updates the TA according to the configuration update message that carries the TA optimization information. Specifically, eNB3 exchanges TAC information with the MME through an S1 interface to update the TA of the MME.

705. The MME sends a configuration update message that carries TA optimization information to the neighboring MME, and the neighboring MME updates the TA (namely, updates the TAC information) according to the TA optimization information, and sends a configuration update confirmation message to the MME. Specifically, the MME exchanges TAC information with the neighboring MME through an S10 interface. The detailed implementation process is:

The MME sends a configuration update message that carries TA optimization information to the neighboring MME through an S10 interface; and the neighboring MME sends a configuration update confirmation message to the MME.

706. After the base stations and the MME finish updating configuration according to the configuration update message that carries TA optimization information, the UE may implement the TA update process in the following three modes:

Mode 1:

(1) When notifying the UE by sending a paging message, the MME adds TA optimization information to an MIB. The information may be a random number. Here, the configuration update message that carries TA optimization information is the paging message. The UE can obtain the TA update time according to the TA optimization information, namely, the random number. Afterward, the UE updates the TA list, namely, updates TA2 in the TA list to TA1.

(2) The updated TA list of the UE is reported to the MME.

(3) The MME pages only TA1 and TA2 at the next time.

Mode 2:

(1) The OAM entity sends a configuration update message that carries the TA optimization information to each base station through a northbound interface. The configuration update message carries an indication of TA change time of each base station and an indication of notifying the TA update time to the UE, where the TA update time is calculated by different base stations in the TA randomly, and notifies the UE to update the TA list at different time. That is, TA2 in the TA list of the UE under eNB3 is updated to TA1.

(2) The updated TA list of the UE is reported to the MME.

(3) The MME pages TA1 and TA2 at the next time.

Mode 3:

(1) Before the OAM entity updates the TA, the MME sends a paging message that carries new TA optimization information to the UE. In this way, the MME notifies the UE to update the TA list directly. Here, the configuration update message that carries TA optimization information is the paging message.

(2) The updated TA list of the UE is reported to the MME.

(3) The MME pages TA1 and TA2 at the next time.

In this embodiment, when TAs are re-planned in the same MME pool area, the OAM entity obtains the TA re-planning optimization threshold, and performs re-planning optimization for the current TA automatically; after completion of the TA re-planning, the OAM entity sends a configuration update message that carries TA optimization information. Therefore, all other entities may update the TA automatically by receiving the configuration update message that carries the TA optimization information. In this way, no manual planning is involved, human resources required for network optimizing are saved greatly, and the cost of network optimizing is reduced.

Figure 8:
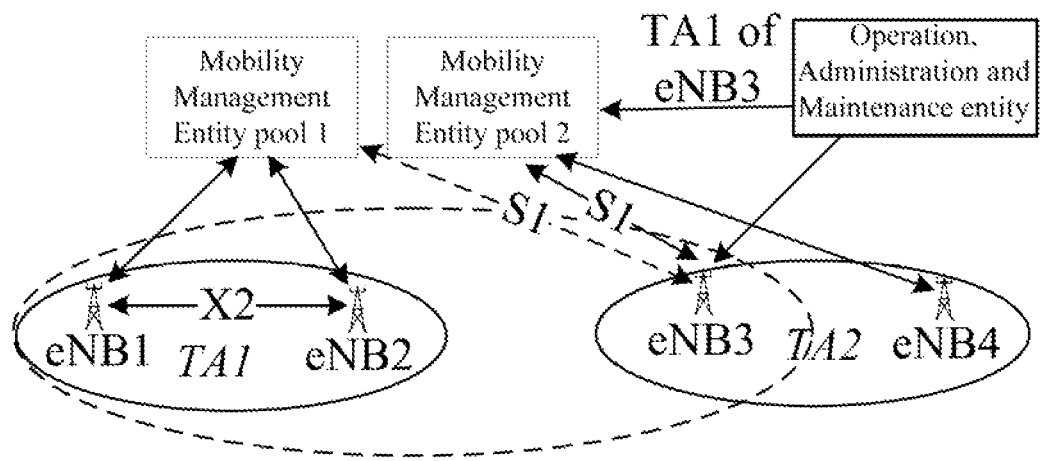
FIG. 8 is a schematic diagram showing how to re-plan a tracking area in different MME pool areas in a tracking area optimization process according to an embodiment of the present invention.

FIG. 8 is a schematic diagram showing how to re-plan TAs in different MME pool areas in a TA optimization process according to an embodiment of the present invention. In this embodiment, it is assumed that eNB1 and eNB2 belong to the same TA1, and that eNB3 and eNB4 belong to the same TA2.

Steps 801-802 are the same as steps 701-702 in FIG. 7 and are not repeatedly described here.

803. In the process of re-planning eNB3, eNB3 disconnects the X2 interface with the base station in MME pool area 2; and eNB3 sets up an X2 interface with the base station in MME pool area 1. Therefore, eNB1, eNB2, eNB3, and eNB4 can exchange TAC information through the X2 interface. The disconnection and the setup of the X2 interface in the re-planning process are described below:

(1) The base station eNB3 in MME pool area 2 sends an X2 interface release message to eNB4 to request the release of the X2 interface. This message carries a cause value, indicating that the TA which covers the eNB has changed.

(2) The base station in MME pool area 2 returns an X2 interface release confirmation/complete message. This step is optional.

(3) eNB4 and eNB3 in MME pool area 2 release the corresponding SCTP association and its resources, and the base stations in MME pool area 2 deletes the relevant configuration information.

(4) eNB3 sets up an SCTP association with MME pool area 1.

(5) eNB3 sends an X2 setup message to the base station in MME pool area 1 to initiate setup of an X2 interface. This message carries TA optimization information.

(6) The base station in MME pool area 1 sends an X2 setup response message to eNB3.

804. In the process of re-planning eNB3, the current MME releases the interface between the base stations, the SCTP association and the resources, and deletes the relevant configuration information; and the neighboring MME sets up an interface with the eNB, sets up the SCTP association, and allocates the corresponding resources. Specifically, eNB3 in TA2 disconnects the S1 interface directed to the MME in MME pool area 2; and eNB3 sets up an S1 interface directed to the MME in MME pool area 1. Therefore, the re-planned eNB1, eNB2, and eNB3 can exchange TAC information with the MME in MME pool area 1 through the S1 interface. The disconnection and the setup of the S1 interface between eNB3 and the MME are described below:

(1) eNB3 sends an S1 interface release message to the MME in MME pool area 2 to request the release of the S1 interface. This message carries a cause value, indicating that the TA which covers the eNB has changed.

(2) The MME in MME pool area 2 sends an S1 interface release confirmation/complete message to the eNB. This step is optional.

(3) eNB3 releases the corresponding SCTP association with the MME in MME pool area 2, and releases the corresponding resources; and the MME deletes the configuration information related to eNB3.

(4) eNB3 sets up an SCTP association with the MME in MME pool area 1.

(5) eNB3 sends an S1 setup message to the MME in MME pool area 1 to initiate setup of an S1 interface. This message carries TA optimization information.

(6) The MME in MME pool area 1 sends an S1 setup response message to eNB3.

805. After the base stations and the MME finish updating configuration according to the configuration update message that carries TA optimization information, the UE may implement the TA update process in the following three modes:

Mode 1:

(1) When notifying the UE by sending a paging message, the MME adds TA optimization information to an MIB. The information may be a random number. Here, the configuration update message that carries TA optimization information is the paging message. The UE can obtain the TA update time according to the TA optimization information, namely, the random number. Afterward, the UE updates the TA list, namely, updates TA2 in the TA list to TA1.

(2) The updated TA list of the UE is reported to the MME in MME pool area 1.

(3) The MME in MME pool area 1 pages only TA1 at the next time; and the MME in MME pool area 2 goes on paging TA2 at the next time.

Mode 2:

(1) The OAM entity sends a configuration update message that carries the TA optimisation information to each base station through a northbound interface. The configuration update message carries an indication of TA change time of each base station and an indication of notifying the TA update time to the UE, where the TA update time is calculated by different base stations in the TA randomly, and notifies the UE to update the TA list at different time. That is, TA2 in the TA list of the UE under eNB3 is updated to TA1.

(2) The updated TA list of the UE is reported to the MME in MME pool area 1.

(3) The MME in MME pool area 1 pages only TA1 at the next time; and the MME in MME pool area 2 goes on paging TA2 at the next time.

Mode 3:

(1) The MME sends a paging message that carries new TA optimization information to the UE. In this way, the MME notifies the UE to update the TA list directly. Here, the configuration update message that carries TA optimization information is the paging message.

(2) The updated TA list of the UE is reported to the MME in MME pool area 1.

(3) The MME in MME pool area 1 pages only TA1 at the next time; and the MME in MME pool area 2 goes on paging TA2 at the next time.

In this embodiment, when TAs are re-planned in different MME pool areas, the OAM entity obtains the TA re-planning optimization threshold, and performs re-planning optimization for the current TA automatically; after completion of the TA re-planning, the OAM entity sends a configuration update message that carries TA optimization information. Therefore, all other entities can update the TA automatically by receiving the configuration update message that carries the TA optimization information. In this way, no manual planning is involved, human resources required for network optimizing are saved greatly, and the cost of network optimizing is reduced.

Figure 9:
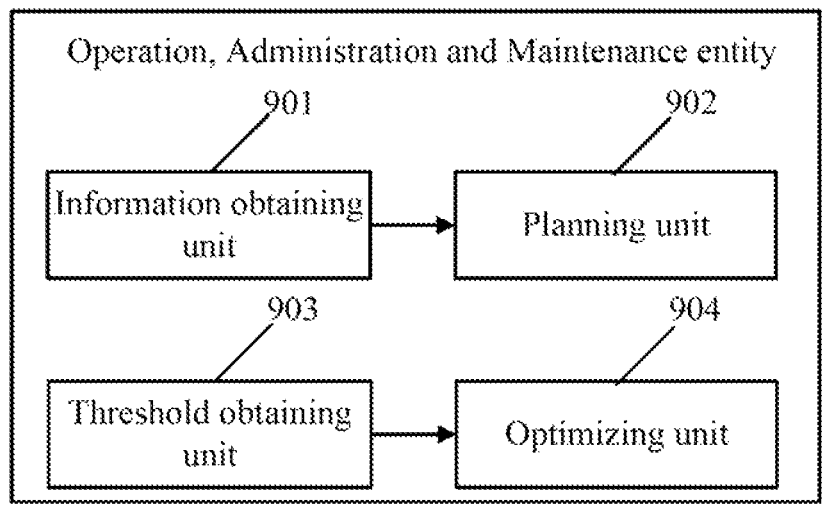
FIG. 9 is a schematic structural diagram of an Operation, Administration and Maintenance entity according to an embodiment of the present invention.

FIG. 9 shows an OAM entity according to an embodiment of the present invention. The OAM entity includes: a threshold obtaining unit 903, configured to obtain an optimization threshold; and an optimizing unit 904, configured to perform a tracking area optimization according to the optimization threshold.

If the OAM entity is capable of automatic TA planning, the OAM entity further includes: an information obtaining unit 901, configured to obtain the base station scene information, geographic location information, number of tracking areas under planning, threshold value of planned tracking areas, and threshold value of base stations included in a tracking area; and a planning unit 902, configured to plan the tracking area according to the base station scene information, geographic location information, number of tracking areas under planning, threshold value of planned tracking areas, and threshold value of base stations included in a tracking area.

It should be noted that if new base stations need to be added to the planned areas that cover all TAs, the Operation, Administration and Maintenance entity further includes: a first planning subunit, configured to: obtain geographic location information of the new base stations needed to be added, distance between the new base stations and neighboring base stations, and paging capacity of the tracking areas around the new base stations if the new base stations need to be added to the planned areas that cover all tracking areas; add the new base stations to the tracking area with the smallest paging capacity according to the geographic location information of the new base stations, distance between the new base stations and the neighboring base stations, and paging capacity of the tracking areas around the new base stations; and send a message that carries tracking area optimization information; or a second planning subunit, configured to: if new base stations need to be added to the planned areas that cover all tracking areas, obtain geographic location information of the new base stations needed to be added, and the tracking area that covers a neighboring base station which has the strongest signals, add the new base stations to the tracking area that covers a neighboring base station which has the strongest signals, and send a message that carries tracking area optimization information.

Figure 10:
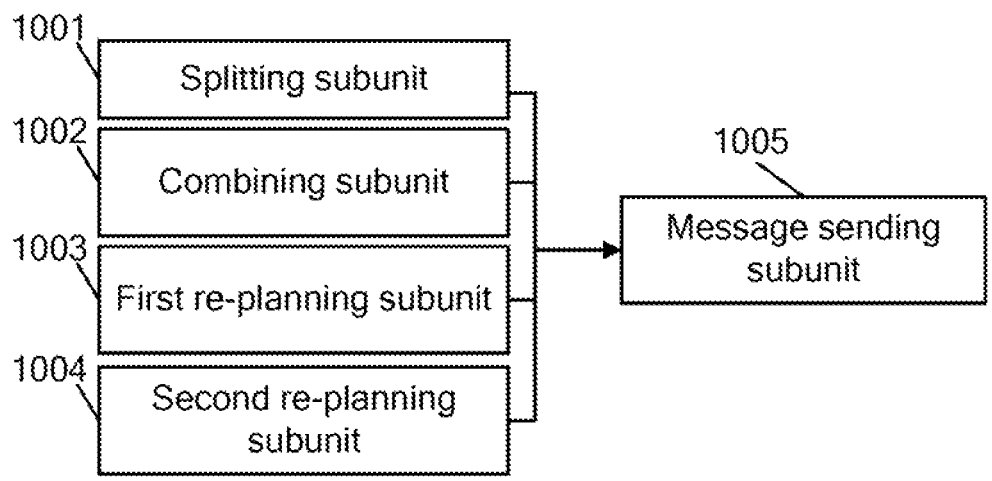
FIG. 10 is a schematic structural diagram of an optimizing unit in an Operation, Administration and Maintenance entity according to an embodiment of the present invention.

More specifically, as shown in FIG. 10, the optimizing unit in the Operation, Administration and Maintenance entity in this embodiment includes the following subunits:

a splitting subunit 1001, configured to split the current tracking area into two tracking areas if the paging count of the current tracking area is greater than the optimization threshold which is a tracking area splitting threshold; and/or a combining subunit 1002, configured to combine the current tracking area with a neighboring tracking area if the sum of the paging count of the current tracking area and the paging count of the neighboring tracking area is less than the optimization threshold which is a tracking area combination threshold; and/or a first re-planning subunit 1003, configured to: obtain information about the base station that needs to be re-planned and judge, according to the information about the base station needed to be re-planned, the paging capacity of the neighboring tracking area if the paging count of the current tracking area is greater than the optimization threshold; plan the base station needed to be re-planned to the neighboring tracking area if the paging capacity of the neighboring tracking area permits, or re-plan the base station needed to be re-planned if the paging capacity of the neighboring tracking area does not permit, where the optimization threshold is a re-planning threshold; and/or a second re-planning subunit 1004, configured to plan a border base station to the neighboring tracking area if a ratio obtained by dividing the count of handovers of a UE under the border base station to a cell under the neighboring tracking area by the count of handovers back to the cell under the current tracking area is greater than the re-planning threshold, where the optimization threshold is the re-planning threshold.

It should be noted that the optimizing unit may further include a message sending subunit 1005, which is configured to send a message that carries tracking area optimization information.

Figure 11:
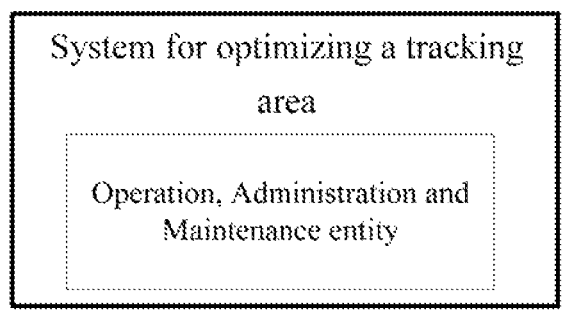
FIG. 11 is a schematic structural diagram of a system for optimizing a tracking area according to an embodiment of the present invention.

As shown in FIG. 11, an embodiment of the present invention provides a system for optimizing a tracking area, where the system includes the foregoing Operation, Administration and Maintenance entity.

With the Operation, Administration and Maintenance entity and the system for optimizing a tracking area provided in this embodiment of the present invention, the TA may be optimized, planned and expanded automatically. In this way, it is not necessary to perform the planning, optimization or expansion manually, human resources are saved greatly, and the cost of network planning is reduced.

Figure 12:
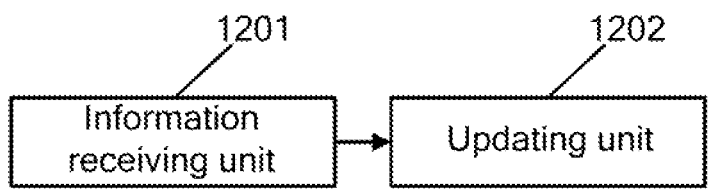
FIG. 12 is a schematic structural diagram of an apparatus for updating a tracking area according to an embodiment of the present invention.

As shown in FIG. 12, an embodiment of the present invention provides an apparatus for updating a tracking area, where the apparatus includes: an information receiving unit 1201 and an updating unit 1202. The information receiving unit 1201 is configured to receive a configuration update message that carries tracking area optimization information; and the updating unit 1202 is configured to update a tracking area according to the configuration update message.

It should be noted that the apparatus for updating a tracking area may be set in an MME. In this case, the information receiving unit 1201 is further configured to receive a configuration update message that carries tracking area optimization information from the OAM entity or base station; and the updating unit 1202 is further configured to judge that the tracking area has been optimized according to the configuration update message, and update the tracking area according to the configuration update message.

The apparatus for updating a tracking area may also be located in a base station. In this case, the information receiving unit 1201 is further configured to receive a configuration update message that carries tracking area optimization information from the Operation, Administration and Maintenance entity or Mobility Management Entity; and the updating unit 1202 is further configured to judge that the tracking area has been optimized according to the configuration update message, and update the tracking area according to the configuration update message.

The apparatus for updating a tracking area may also be located in a UE. In this case, the information receiving unit 1201 is further configured to receive a configuration update message that carries tracking area optimization information from the Mobility Management Entity or base station; and the updating unit 1202 further includes: an update time obtaining subunit which is configured to obtain the tracking area update time according to the tracking area optimization information carried in the configuration update message; and an updating subunit, configured to update the tracking area according to the tracking area update time.

Figure 13:
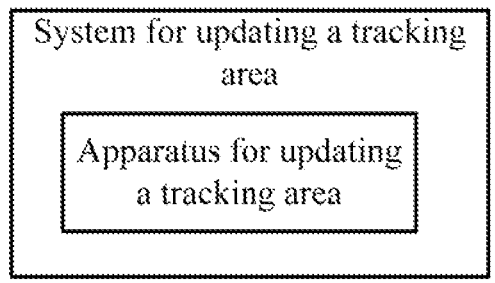
FIG. 13 is a schematic structural diagram of a system for updating a tracking area according to an embodiment of the present invention.

As shown in FIG. 13, an embodiment of the present invention provides a system for updating a tracking area, where the system includes the foregoing apparatus for updating a tracking area.

With the apparatus and system for updating a tracking area according to this embodiment of the present invention, a TA is updated according to a received configuration update message that carries TA optimization information. Therefore, the entities that need to perform a TA update can update the TA automatically according to the received configuration update message that carries TA optimization information. In this way, human resources are saved greatly, and the cost of network updating is reduced.

From the description of the preceding embodiments, persons of ordinary skill in the art should understand that all or part of the steps of the method specified in any embodiment above may be implemented by a program instructing relevant hardware. The program may be stored in a computer-readable storage medium such as a ROM, a RAM, a magnetic disk or a compact disk. When the program runs, the program executes the steps of the method specified in any embodiment above.

The method, the base station and the system provided in the embodiments of the present invention may be applicable to an LTE system and other communication systems.

The preceding descriptions are merely exemplary embodiments of the present invention, but not intended to limit the scope of the present invention. Any modifications, variations or replacements that can be easily derived by those skilled in the art shall fall within the scope of the present invention. Therefore, the scope of the present invention is subject to the appended claims.

What is claimed is:

1. A method for an Operation, Administration and Maintenance (OAM) entity in a mobile communication network which is divided into different tracking areas, the OAM is configured with a northbound interface Itf-N or a private interface Itf-S, the OAM exchanges information with other network entities through the northbound interface Itf-N or the private interface Itf-S, wherein the OAM is configured to add a new base station to a tracking area, comprising:

obtaining geographic location information of the new base station through the northbound interface Itf-N or the private interface Itf-S by the OAM, distance from the new base station to a neighboring base station, and paging capacity of tracking areas which are around the new base station; and adding the new base station to a tracking area with smallest paging capacity according to the geographic location information of the new base station, the distance from the new base station to the neighboring base station, and the paging capacity of the tracking areas which are around the new base station.

* * * * *

UNITED STATES PATENT AND TRADEMARK OFFICE
CERTIFICATE OF CORRECTION

PATENT NO. : 8,886,202 B2
APPLICATION NO. : 13/216697
DATED : November 11, 2014
INVENTOR(S) : Wang et al.

It is certified that error appears in the above-identified patent and that said Letters Patent is hereby corrected as shown below:

Title Page, Item (75), Under Inventors:

"Shlai Zhu, Shenzhen (CN)" should read --Shiai Zhu, Shenzhen (CN)--

Signed and Sealed this
Thirty-first Day of March, 2015

Michelle K. Lee
*Director of the United States Patent and Trademark Office*